United States Patent
Staude et al.

(10) Patent No.: US 10,025,595 B2
(45) Date of Patent: Jul. 17, 2018

(54) COMPUTER SYSTEM AND OPERATING METHOD

(71) Applicant: Fujitsu Technology Solutions Intellectual Property GmbH, München (DE)

(72) Inventors: Rainer Staude, Fischach (DE); Rudolf Häussermann, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 488 days.

(21) Appl. No.: 14/533,441

(22) Filed: Nov. 5, 2014

(65) Prior Publication Data
US 2015/0277931 A1 Oct. 1, 2015

(30) Foreign Application Priority Data
Mar. 25, 2014 (EP) .................... 14161546

(51) Int. Cl.
| | |
|---|---|
| G06F 9/44 | (2018.01) |
| G06F 1/30 | (2006.01) |
| G06F 1/24 | (2006.01) |
| G06F 11/14 | (2006.01) |
| G06F 9/4401 | (2018.01) |

(52) U.S. Cl.
CPC .............. *G06F 9/4401* (2013.01); *G06F 1/24* (2013.01); *G06F 1/30* (2013.01); *G06F 1/305* (2013.01); *G06F 11/1417* (2013.01)

(58) Field of Classification Search
CPC .......... G06F 11/1417; G06F 1/24; G06F 1/30; G06F 1/305; G06F 9/4401
See application file for complete search history.

(56) References Cited

U.S. PATENT DOCUMENTS

| | | |
|---|---|---|
| 5,428,252 A | 6/1995 | Walker et al. |
| 5,511,204 A | 4/1996 | Crump et al. |

(Continued)

FOREIGN PATENT DOCUMENTS

| | | |
|---|---|---|
| EP | 1 069 495 | 1/2001 |
| JP | 6-318107 | 11/1994 |

(Continued)

OTHER PUBLICATIONS

Corresponding Notice of Reasons for Refusal of JP Application No. 2013-238947 dated Jan. 20, 2015 with English translation.

(Continued)

*Primary Examiner* — Terrell Johnson
(74) *Attorney, Agent, or Firm* — DLA Piper LLP (US)

(57) ABSTRACT

A computer system including a power supply unit that generates at least one DC supply voltage ($V_{cc}$, $V_{aux}$) based on an AC supply voltage ($V_{AC}$), and a system board electrically connected to the power supply unit, the system board comprising a sequencing microcontroller that selectively activates further components of the system board, the further components comprising a chipset, wherein the sequencing microcontroller monitors the state of at least one control signal of the power supply unit and/or the system board to detect a shutdown and a successful reboot of the system board and, after a shutdown of the system board is detected, signals a reboot command to at least the chipset at predetermined intervals until a successful reboot of the system board is detected.

19 Claims, 2 Drawing Sheets

(56) References Cited

U.S. PATENT DOCUMENTS

| | | | |
|---|---|---|---|
| 6,274,949 B1* | 8/2001 | Lioux | G06F 1/30 307/64 |
| 6,775,784 B1 | 8/2004 | Park | |
| 2003/0204709 A1* | 10/2003 | Rich | G06F 9/4401 713/1 |
| 2006/0136765 A1 | 6/2006 | Poisner et al. | |
| 2010/0100719 A1* | 4/2010 | Chen | G06F 1/3203 713/2 |
| 2011/0271131 A1 | 11/2011 | Lefebvre et al. | |
| 2013/0113532 A1 | 5/2013 | Lee | |

FOREIGN PATENT DOCUMENTS

| | | |
|---|---|---|
| JP | 8-87365 | 4/1996 |
| JP | 3065683 | 11/1999 |
| JP | 2000-267767 | 9/2000 |
| JP | 2001-075684 | 3/2001 |
| JP | 2005-141623 | 6/2005 |
| JP | 2008-40559 | 2/2008 |
| JP | 2008-522322 | 6/2008 |
| JP | 2010-79778 | 4/2010 |
| JP | 2011-39963 | 2/2011 |
| JP | 2011-180770 | 9/2011 |
| JP | 2012-22533 | 2/2012 |
| JP | 2012-27790 | 2/2012 |
| WO | 2010/087855 | 8/2010 |

OTHER PUBLICATIONS

Japanese Notice of Reason(s) for Rejection dated Mar. 1, 2016, of corresponding Japanese Application No. 2014-226767, along with an English translation.

* cited by examiner

COMPUTER SYSTEM AND OPERATING METHOD

TECHNICAL FIELD

This disclosure relates to a computer system comprising a power supply unit that generates at least one DC supply voltage based on an AC supply voltage and a system board electrically connected to the power supply unit. Furthermore, the disclosure relates to a method of operating a computer system.

Background

Computer systems of the above-mentioned type are widely known in the field of information technology systems. In particular, most computer systems that can be electronically switched on and off are usually provided with an auxiliary voltage in a so-called "soft-off" or standby state. In this way, reactivation of the computer system, for example, by a timer, a key of the keyboard or a remote request, is enabled. Consequently, at least some components of a computer system remain powered at all times.

However, in exceptional circumstances such as power outages or unintended interruption of an AC supply line, the provision of the auxiliary voltage will be stopped. To enable an automatic restart of the computer system, a chipset may detect the interruption of an operating voltage. Furthermore, many firmware components such as BIOS programs, allow the automatic entering of a predefined operating mode of a computer system upon a first provision of an operating voltage. For example, many computer systems provide a firmware setting which defines an operating state according to the ACPI standard to be entered upon power-up.

However, despite the mechanisms described above, conventional approaches suffer from several drawbacks. In particular, they cannot ensure that the AC failure is detected in all operating states of the computer system. For example, if a relatively short power outage occurs during initialization of a computer system, the auxiliary voltage may not be interrupted. However, some components of the computer system such as the chipset of a system board, may not detect the presence of an AC failure. Furthermore, if an operating voltage is interrupted for some components but not interrupted for other component, the computer system may end up in an undefined state. For example, a power supply unit that has already received a command to start up may not complete the startup operation if, during the start-up operation, an externally supplied AC supply voltage is interrupted. However, the chipset supplied with an auxiliary voltage may not become aware of the AC failure. In that case, a chipset of a connected system board may wait an indefinite amount of time for the provision of a power good signal by the power supply unit. This may result in a "hanging" of the computer system, i.e. a deadlock situation.

Other problems may arise from a manually or automatically triggered shutdown. For example, some maintenance software request a shutdown of a computer system under maintenance.

In those situations, a manual restart of the computer system, for example, by pressing a reset button or by disconnecting the computer system from the AC supply voltage for a prolonged period of time may be required to successfully restart the computer system. Such manual restart operations can result in relatively high maintenance costs, particularly in integrated computer systems installed at remote locations, such as ATMs, self-service terminals or control computers.

There is thus a need for improved systems and methods of shutdown detection of computer systems. Preferably the successful reboot of the computer system should be monitored, even in the presence of AC failures.

SUMMARY

We provide a computer system, including a power supply unit that generates at least one DC supply voltage ($V_{cc}$, $V_{aux}$) based on an AC supply voltage ($V_{AC}$), and a system board electrically connected to the power supply unit, the system board comprising a sequencing microcontroller that selectively activates further components of the system board, the further components comprising a chipset, wherein the sequencing microcontroller monitors the state of at least one control signal of the power supply unit and/or the system board to detect a shutdown and a successful reboot of the system board and, after a shutdown of the system board is detected, signals a reboot command to at least the chipset at predetermined intervals until a successful reboot of the system board is detected.

We also provide a method of operating a computer system, the computer system including a power supply unit and a system board electrically connected to the power supply unit, the system board comprising a sequencing microcontroller and a chipset, wherein the sequencing microcontroller performs the following steps: detecting a shutdown of the system board; if a shutdown is detected, signaling a reboot command to at least the chipset and activating a first timer; monitoring at least one control signal provided by the chipset to determine if the rebooting of the system board is successful and deactivating the first timer if the monitored control signal indicates that the rebooting of the system board was successful; and resending the reboot command, if the activated first timer reaches a predetermined value.

We further provide a computer system including a power supply unit and a system board electrically connected to the power supply unit, the system board comprising a sequencing microcontroller and a chipset, wherein the sequencing microcontroller performs the following steps: detecting a connection of the power supply unit to an AC supply voltage ($V_{AC}$); if a connection of the power supply unit to an AC supply voltage ($V_{AC}$) is detected, signaling a boot command to at least the chipset and activating a first timer; monitoring at least one control signal provided by the chipset to determine if the rebooting of the system board was successful and deactivating the first timer if the monitored control signal indicates that the rebooting of the system board was successful; and sending a reboot command, if the activated first timer reaches a predetermined value.

BRIEF DESCRIPTION OF THE DRAWINGS

Further details and advantages of our systems and methods will be described below with respect to examples with reference to the attached drawings.

LIST OF REFERENCE SYMBOLS

Figure 1:
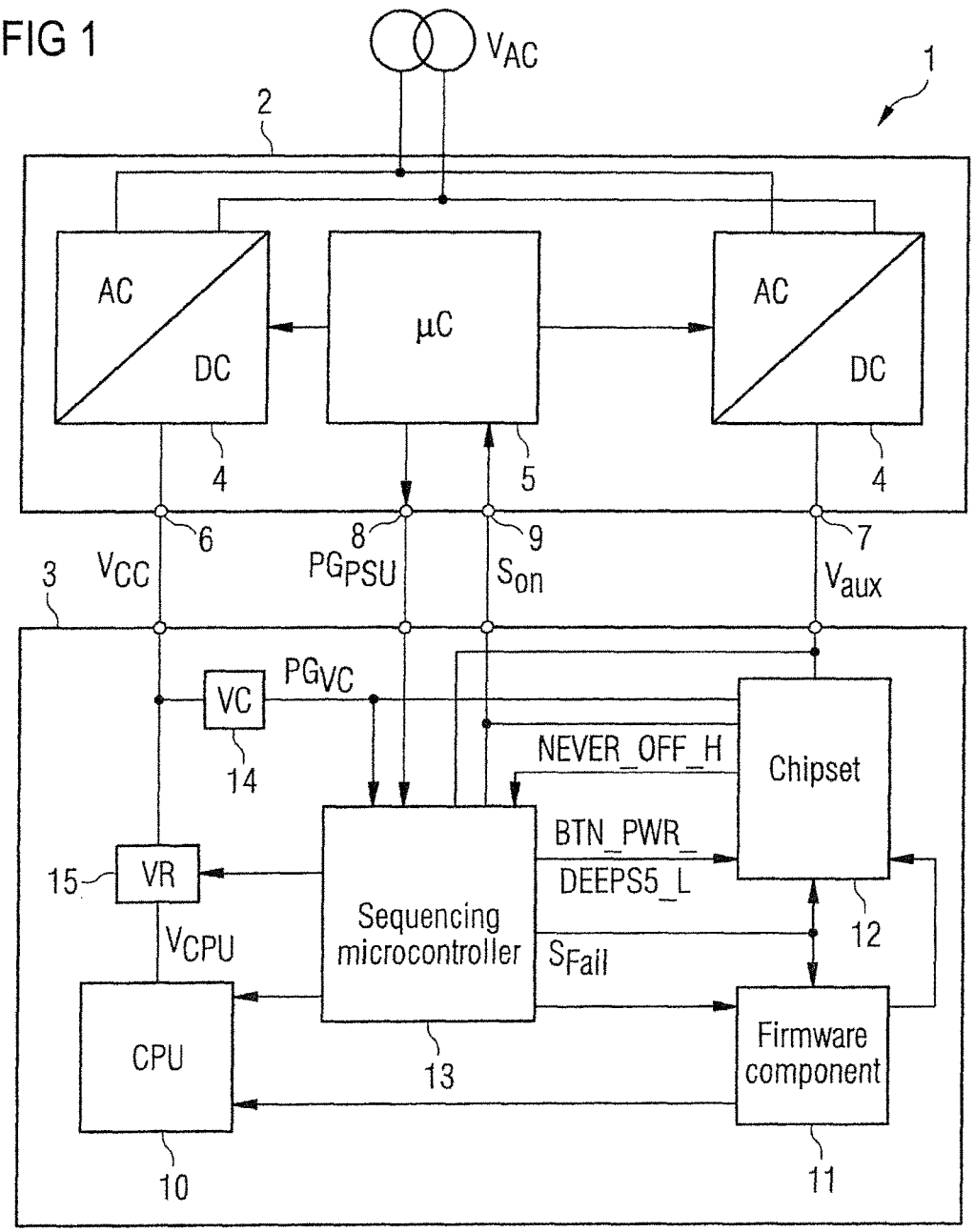
FIG. 1 shows a schematic diagram of an example of our computer system.

1 computer system
2 power supply unit 3 system board
4 AC/DC converter
5 microcontroller
6 supply voltage terminal
7 auxiliary voltage terminal
8 control signal output
9 control signal input
10 CPU
11 firmware component
12 chipset
13 sequencing microcontroller
14 voltage comparator
15 voltage regulator
20 AC failure state
21 standby mode
22 initialization state
23 normal operating mode
$PG_{PSU}$ power good signal (of the PSU)
$PG_{VC}$ power good signal (of the system board)
$S_{fail}$ failure signal
$S_{on}$ mode control signal
$T_{max}$ predetermined time period
$V_{AC}$ AC supply voltage
$V_{aux}$ auxiliary voltage
$V_{cc}$ secondary supply voltage
NEVER_OFF_H never off signal
BTN_PWR_DEEPS5_L power signal

DETAILED DESCRIPTION

Our computer system may comprise a power supply unit that generates at least one DC supply voltage based on an AC supply voltage. The computer system may further comprise a system board electrically connected to the power supply unit, the system board comprising a sequencing microprocessor that selectively activates further components of the system board, the further components comprising a chipset. The sequencing microcontroller is configured to monitor the state of at least one control signal of the system board to detect a shutdown and a successful reboot of the system board and, if a shutdown of the system board is detected, to signal a reboot command to at least the chipset in predetermined intervals until a successful reboot of the system board is detected, after a shutdown of the system board is detected.

By implementing the monitoring of at least one control signal by a sequencing microcontroller rather than higher level components such as an operating system or the chipset, a shutdown of a system board can be detected in all operating states of the computer system, including an initialization phase, e.g. a booting of the computer system. Furthermore, the described system is independent from the internal control operations of the power supply unit and a specific initialization sequence of the chipset. By sending a reboot command after a detection of a shutdown of the system board, rebooting of the system board is triggered, for example, in case the computer system is shut down accidentally by a user. Sending the reboot command in predetermined intervals until a successful reboot of the system board is detected increases the probability that the system board reboots, i.e. decreases the probability of finally failing to reboot due to a failure during reboot.

We also provide methods of operating a computer system. The computer system comprises a power supply unit and a system board electrically connected to the power supply unit, the system board comprising a sequencing microprocessor and a chipset. The sequencing microcontroller performs the following steps:
  detecting a shutdown of the system board;
  if a shutdown was detected, signaling a reboot command to at least the chipset and activating a first timer;
  monitoring at least one control signal provided by the chipset to determine if the system board is rebooting and deactivating the first timer if the monitored control signal indicates a rebooting of the system board; and
  resending the reboot command, if the activated first timer reaches a predetermined value.

By detecting a shutdown of the system board and signaling a reboot command to at least the chipset the sequencing microcontroller controls the computer system such that the system board reboots automatically after it is shut down. This effectively implements a so-called "never off" function. This is advantageous in industrial computer systems that need to operate at all times.

The method may further comprise the following steps:
  detecting a connection of the power supply unit to an AC supply voltage,
  activating a second timer in response to a request to enter a predefined operating mode of the computer system,
  monitoring at least one power good signal for at least a predetermined period of time, and
  signaling a failure of the AC supply voltage to at least the chipset if the at least one power good signal is not received within the predetermined period of time from the request to enter the predefined operating mode of the computer system.

By monitoring the provision of a power good signal within a predetermined period of time after requesting to enter the predefined operating mode of the computer system through the sequencing microcontroller, potential deadlock situations caused by AC failures during startup can be detected and thus avoided.

The computer system may comprise a firmware component configured to activate a predetermined operating mode of the computer system in accordance with a stored firmware setting after a shutdown of the system board is detected. Such a setting may be used to force the computer system back into a particular operating mode, even if the computer system is deliberately or accidentally switched off.

The sequencing microcontroller may be configured to selectively provide the at least one DC supply voltage to the further components of the system board and to interrupt the provision of the at least one DC supply voltage to all further components of the system board for a predetermined amount of time. This signals the failure of the AC supply voltage. By interrupting the provision of the at least one DC supply voltage, the components of the system boards can be brought into a well-defined state to enable a subsequent restart of the computer system.

The sequencing microcontroller may be configured to activate a reset control signal provided to the chipset for a predetermined amount of time to signal the failure of the AC supply voltage. By providing a reset control signal, an initialization sequence of components of the computer system can be actively triggered.

The computer system may further comprise a firmware component configured to activate a predefined operating mode of the computer system after a power failure in accordance with a stored firmware setting. The sequencing microcontroller is further configured to provide a control signal to the firmware component to signal the failure of the AC supply voltage. By providing a control signal from the sequencing microcontroller to the firmware component, the firmware component such as a BIOS chip, will be made aware of the AC power failure to subsequently select the predetermined operating mode such as a standby mode or normal operation mode.

Among the control signals monitored by the sequencing microcontroller may be one or more mode control signals provided by the chipset for a request to enter a predetermined operating mode of the computer system. Furthermore, it may comprise one or more power good signals provided by the power supply unit or by a voltage comparator of a system board indicating that the secondary supply voltage has reached a predefined level.

The sequencing microcontroller may continuously monitor the at least one power good signal during a normal operation mode of the computing system and signal a failure of the AC supply voltage to at least the chipset if the at least one power good signal is deactivated during the normal operation mode of the computer system.

FIG. 1 shows a schematic representation of a computer system 1. The computer system 1 comprises a power supply unit 2 and a system board 3 electrically connected to the power supply unit 2.

The power supply unit 2 comprises one or more AC/DC converters 4 such as a main converter and an auxiliary converter. The AC/DC converters 4 may be implemented, for example, as one or more switched mode power supplies. For efficient control of the power supply unit 2, in the described example, a microcontroller 5 may selectively activate and deactivate and/or configure each AC/DC converter 4 to provide one or more secondary supply voltages $V_{cc}$ and one or more auxiliary voltages $V_{aux}$.

Alternatively, only a single DC supply voltage may be provided to a computer system. In particular, external AC adapter converting an AC supply voltage into a single DC supply voltage may be used. In this case, an auxiliary voltage $V_{aux}$ and/or a secondary control voltage $V_{cc}$ may be generated based on the single DC voltage by circuitry arranged on the system board 3. Furthermore, some computer systems 1 may have an AC/DC converter circuit arranged directly on the system board 3 to provide an auxiliary voltage $V_{aux}$ and/or a secondary control voltage $V_{cc}$ directly from an AC supply voltage Referring back to the example shown in FIG. 1, the microcontroller 5 may monitor the proper operation of the AC/DC converter 4 and provide a corresponding control signal, often referred to as a power good signal, $PG_{PSU}$, via a corresponding control signal output 8. In particular, it may provide the power good signal after the voltage at a supply voltage terminal 6 has exceeded a predefined voltage level. Furthermore, the power supply unit 2 comprises a control signal input 9 that receives a control signal $S_{on}$ to selectively switch the power supply unit 2 from a standby mode into a normal operating mode, and vice versa. In the standby mode, the power supply unit 2 will only provide the auxiliary voltage $V_{aux}$ through an auxiliary voltage terminal 7. In the normal operating mode, the power supply unit 2 will also provide the secondary supply voltage $V_{cc}$ at one or more supply voltage terminals 6.

In the example shown in FIG. 1, the system board 3 comprises a CPU 10, a firmware component 11, a chipset 12, a sequencing microcontroller 13, a voltage comparator 14, and a voltage regulator 15. In a normal operation of the computer system 1, the CPU 10 and further components of the system board 3 not shown in FIG. 1 are operated with the secondary supply voltage $V_{cc}$, either directly or indirectly. In CPU 10, the secondary supply voltage $V_{cc}$ of, for example, 12, 5 or 3.3 V may be further converted by the voltage regulator 15 to fit the input requirements of the CPU 10. For example, a secondary supply voltage $V_{cc}$ of 12 V may be converted by a DC converter to an input voltage $V_{CPU}$ of the CPU of 1.5, 1.25 or 1.1 V.

At least some of the components of the system board 3 connect to the auxiliary voltage $V_{aux}$. For example, certain components of the chipset 12 required to reactivate the computer system 1 from a standby or electronically switched off state are provided with the auxiliary voltage $V_{aux}$ whenever the power supply unit 2 connects to an AC supply voltage $V_{AC}$. In the example shown in FIG. 1, in addition to parts of the chipset 12, the sequencing microcontroller 13 also connects to the auxiliary voltage $V_{aux}$. The sequencing microcontroller 13 is configured to selectively activate and deactivate further components of the system board 3. For example, the sequencing microcontroller 13 may directly interrupt the provision of the secondary supply voltage $V_{cc}$ or the auxiliary voltage $V_{aux}$ selectively to the components 10, 11, 12 and 15. Alternatively, these components may be directly connected to respective supply lines of the auxiliary voltage $V_{aux}$ and the secondary supply voltage $V_{cc}$ and may be activated or deactivated by the sequencing microcontroller 13 by predetermined control signals.

It is noted that FIG. 1 is merely a schematic representation of an example computer system 1. It only shows components relevant for understanding. In practice, a computer system may comprise any number of power supply units, system boards and components arranged on the system board. For example, in a server computer system, a number of redundant power supply units may be used to supply a single system board having a plurality of CPUs. Furthermore, some components shown as separate entities in FIG. 1 may be integrated with one another. For example, the firmware component 11 and the chipset 12 may be integrated into a single component. Inversely, in particular the chipset 12 may be in a number of functionally and physically separate components. Furthermore, the voltage comparator 14 and voltage regulator 15 may be integrated. However, at least in some examples, the voltage comparator 14 or the voltage regulator 15 may not be present at all. For example, if the power supply unit 2 provides a power good signal $PG_{PSU}$ to the sequencing microcontroller 13, provision of an additional voltage comparator 14 on the system board 3 may not be necessary. Furthermore, if the power supply unit 2 provides a secondary supply voltage $V_{cc}$ appropriate for the CPU 10, the provision of a voltage regulator 15 will not be necessary.

In the following, the operation of the computer system 1 in accordance with FIG. 1 will be described with respect to the state diagram of FIG. 2.

A "never off" feature may be implemented in the computer system 1. By activating a corresponding firmware setting in a setup dialogue of a BIOS program stored in the firmware component 11, a user can set the computer system 1 to activate the "never off" feature. Activating "never off" feature results in a rebooting of the system board 3 after detecting a shutdown of the system board 3. Therefore, the computer system 1 cannot be switched off by a user or a software for a period longer than the time required for rebooting.

If the "never off" feature of the computer system 1 is set as active, the BIOS program stored in the firmware component 11 configures the chipset 12 to send a NEVER_OFF_H control signal to a input pin of the sequencing controller 13. Otherwise, this signal is deasserted.

If the chipset 12 sends the NEVER_OFF_H signal to the input pin of the sequencing microcontroller 13, the sequencing microcontroller 13 monitors the $S_{on}$ mode control signal to detect a shutdown of the system board 3. In other examples the sequencing microcontroller 13 monitors another signal, like a $V_{cc}$ secondary supply voltage to detect a shutdown of the system board 3.

If the sequencing microcontroller 13 detects a shutdown of the system board 3, the sequencing microcontroller 13 sends a BTN_PWR_DEEPS5_L signal to a power button pin BTN_PWR_PCH_L of the chipset 12 to reboot the system board 3 and therefore restart and reactivate the computer system 1.

After sending the BTN_PWR_DEEPS5_L signal to the chipset 12, the sequencing microcontroller 13 monitors control signals of the chipset 12. By monitoring the control signals of the chipset 12, the sequencing microcontroller 13 can detect failures in rebooting of the system board 3. The sequencing microcontroller 13 resends the BTN_PWR_DEEPS5_L signal to the chipset 12 after time intervals of 3000 milliseconds until the control signals of the chipset 12 indicate that the reboot of the system board 3 is successful. Of course, the time interval can have other values. For example, the time interval can be chosen longer.

Additionally, the computer system 1 can be provided with an AC failure recognition. Upon first connection of the computer system 1 to the AC supply voltage $V_{AC}$, the computer system 1 in general and the sequencing microcontroller 13 in particular enter a so-called "AC failure state" 20. The AC failure state 20 may be detected, for example, by the provision of an auxiliary voltage $V_{aux}$ to the sequencing microcontroller 13 after a previous interruption of the auxiliary voltage $V_{aux}$.

In this context, it should be noted that not all interruptions of a primary AC supply voltage $V_{AC}$ necessarily lead to an interruption of the secondary auxiliary voltage $V_{aux}$. In particular, typically power supply units 2 comprise one or more buffering capacitors or other energy storage elements, which may provide the auxiliary voltage $V_{aux}$ for a predetermined period of time after a failure of the AC supply voltage $V_{AC}$. For example, in a power supply unit 2 typically used in a server system, the auxiliary voltage $V_{aux}$ may be provided for a time of roughly 30 seconds after a primary supply voltage $V_{AC}$ has been interrupted.

A detection of an AC failure results in the generation of a corresponding control signal after the power supply unit 2 is reconnected to the AC supply voltage $V_{AC}$. For this purpose, in the example shown in FIG. 1, the sequencing microcontroller 13 provides a failure signal $S_{fail}$ to the chipset 12 and/or the firmware component 11.

After a predetermined waiting period, the sequencing microcontroller 13 may provide the auxiliary voltage $V_{aux}$ to the chipset 12. In response to the provision of the auxiliary voltage $V_{aux}$, the chipset 12 will be initialized and the computer system 1 will enter a predefined standby mode 21. In the diagram of FIG. 2, the computer system 1 enters the ACPI standby state S5. Alternatively, the computer system 1 may enter the ACPI suspend state S3. In case the auxiliary voltage $V_{aux}$ should fail in the standby mode 21, the computer system 1 returns to the AC failure state 20.

If the power is not interrupted, after an optional waiting time, the chipset 12 may issue a control signal $s_{on}$ to the microcontroller 5 to activate the provision of the secondary supply voltage $V_{cc}$. Alternatively, the activation of the power supply unit 2 may also be requested by the sequencing microcontroller 13. As a result, the computer system 1 changes into an initialization state 22. In response to the control signal $s_{on}$, the microcontroller 5 activates or reconfigures the AC/DC converter 4 to provide the secondary supply voltage $V_{cc}$ in addition to the auxiliary voltage $V_{aux}$.

In the initialization state 22, the chipset 12 will wait for the provision of a so-called "power good signal" either from the power supply unit 2, the comparator 14, or both. However, in case a further interruption of the AC supply voltage $V_{AC}$ occurs at this state, the power supply unit 2 may not be able to provide the requested secondary supply voltage $V_{cc}$ such that the computer system 1 cannot continue its initialization procedure.

To detect and avoid a deadlock situation, the sequencing microcontroller 13 actively monitors both the mode control signal $S_{on}$ provided to the power supply unit 5 as well as the power good signals $PG_{PSU}$ and $PG_{VC}$ provided by the power supply unit 2 and the voltage comparator 14, respectively. In particular, after the activation of the power supply unit 2 has been requested using the control signal $S_{on}$, the sequencing microcontroller 13 starts a timer, which will time out after a predetermined period of time $T_{max}$, for example, 500 milliseconds. Normally, this should be sufficient for the power supply unit 2 to provide the requested secondary supply voltage $V_{cc}$.

However, in case of a further AC failure, either the control signal $PG_{PSU}$ or the control signal $PG_{VC}$ will not be provided within the predetermined time period. In this way, the sequencing microcontroller 13 will detect the occurrence of the AC failure during the start of the power supply unit 2. In response, the sequencing microcontroller 13 will signal the occurrence of a failure, in particular a failure of the AC supply voltage $V_{AC}$, to other components of the system board 3. In particular, the sequencing microcontroller 13 may again provide the failure signal $S_{fail}$ to the chipset 12 and return to the AC fail state 20.

The failure of the AC supply voltage $V_{AC}$ may be signaled in different ways. According to a first example, the sequencing microcontroller 13 will interrupt the auxiliary supply voltage $V_{aux}$ to all components connected to the sequencing microcontroller 13. In particular, the chipset 12 will be disconnected from the auxiliary voltage $V_{aux}$ for a predetermined period of time resulting in a full system reset. In response to such an interruption of the auxiliary voltage $V_{aux}$, the chipset 12 will start its initialization sequence again. Alternatively, in case the chipset 12 is directly connected to the auxiliary voltage $V_{aux}$, the sequencing microcontroller 13 may provide an appropriate control signal, for example, a resume-reset signal to the chipset 12. This signal will be asserted and de-asserted after a predetermined amount of time to actively request a re-initialization of the chipset 12 and potentially further components of the system board 3.

In case a further power outage of the power supply unit 2 should occur during the subsequent initialization phase, the sequencing microcontroller 13 will again signal an AC failure such that no deadlock situation will arise. Assuming that the primary AC supply voltage $V_{AC}$ eventually becomes stable, the chipset 12 and other components of the system board 3 will finally proceed with a normal initialization process. In particular, both the power supply unit 2 and the voltage comparator 14 will generate a respective power good signal $PG_{PSU}$ and $PG_{VC}$ within the predetermined period of time $T_{max}$ from the provision of the mode control signal $S_{on}$. In response, the computer system enters a normal operating mode 23, in particular the ACPI S0 state, in which the CPU 10 becomes operational.

Accordingly, the firmware components 11 will start executing BIOS code on the CPU 10. During the execution of the BIOS code, due to assertion of an appropriate control signal through the sequencing microcontroller 13 or the chipset 12, the BIOS component 11 will be made aware of the occurrence of the previous AC failure. In response to a corresponding BIOS setting, the BIOS code of the firmware components 11 may instruct the computer system 1 to remain in the operating mode 23, i.e. the ACPI S0 state, or to return to the standby mode 21, e.g. either the ACPI S3 or S5 state. For example, if the computer system 1 is configured to enter the ACPI S5 state after the occurrence of an AC failure, a corresponding mode change back to the standby mode 21 may be requested by de-asserting the mode control signal $S_{on}$.

Figure 2:
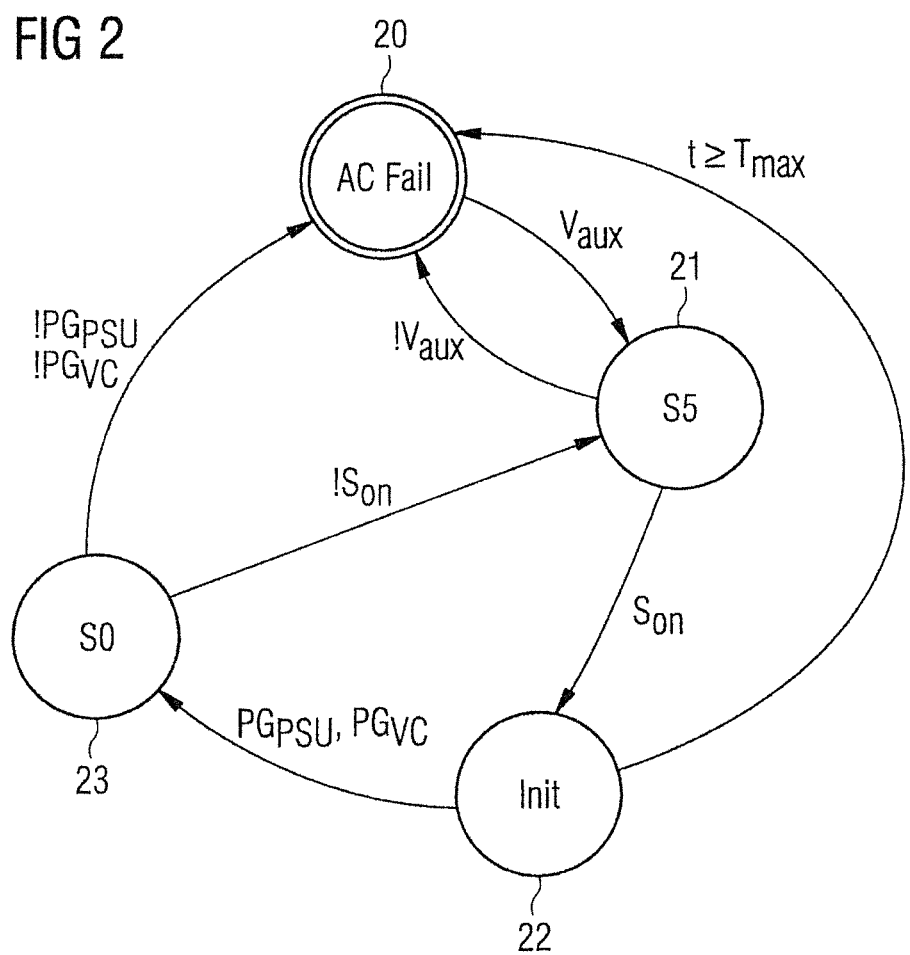
FIG. 2 shows a state diagram of the operating states of an example of our computer system.

As indicated in FIG. 2, in the normal operating mode 23, the sequencing microcontroller 13 keeps monitoring one or both power good signals $PG_{PSU}$ and $PG_{VC}$. In case one or both of the power good signals should fail, the system returns to the AC fail state 20.

In effect, by monitoring the control signals $PG_{PSU}$, $PG_{VC}$ and/or $s_{on}$ provided by the power supply unit 2 and components of the system board 3, the sequencing microcontroller 13 can detect the occurrence of AC power failure in all operating states of the computer system 1, including an initialization state 22. By signaling the detection of an AC failure to other components of the system board 3, in particular the chipset 12, even short AC power failures, which may not lead to an interruption of the auxiliary voltage $V_{aux}$, can be detected by all components, ensuring that the components of the system board 3 can be brought into a well-defined state. This is of particular importance for remotely installed computer systems, where a manual re-initialization is either impossible or very costly.

We claim:

1. A computer system comprising:
   a power supply unit that generates at least one DC supply voltage ($V_{cc}$, $V_{aux}$) based on an AC supply voltage ($V_{AC}$), and
   a system board electrically connected to the power supply unit, the system board comprising a sequencing microcontroller that selectively activates further components of the system board, the further components comprising a CPU and a chipset, wherein the sequencing microcontroller monitors the state of at least one control signal of the power supply unit and/or the system board to detect a shutdown and to detect a successful reboot of the system board and, after a shutdown of the system board is detected, signals a reboot command to at least the chipset at predetermined intervals until a successful reboot of the system board is detected.

2. The computer system according to claim 1, wherein the further components comprise a firmware component that activates a predetermined operating mode of the computer system in accordance with a stored firmware setting after a shutdown of the system board is detected.

3. The computer system according to claim 1, wherein the sequencing microcontroller further detects a failure of the AC supply voltage ($V_{AC}$) and signals the failure of the AC supply voltage ($V_{AC}$) to at least the chipset.

4. The computer system according to claim 3, wherein the sequencing microcontroller selectively provides the at least one DC supply voltage ($V_{cc}$, $V_{aux}$) to the further components of the system board and interrupts the provision of the at least one DC supply voltage ($V_{cc}$, $V_{aux}$) to all further components of the system board for a predetermined period of time to signal the failure of the AC supply voltage ($V_{AC}$).

5. The computer system according to claim 3, wherein the sequencing microcontroller provides a resume-reset control signal to the chipset for a predetermined amount of time to signal the failure of the AC supply voltage ($V_{AC}$).

6. The computer system according to claim 3, wherein the further components comprise a firmware component that activates a predetermined operating mode of the computer system after a power failure in accordance with a stored firmware setting, wherein the sequencing microcontroller further provides a failure signal ($S_{fail}$) to the firmware component to signal the failure of the AC supply voltage ($V_{AC}$).

7. The computer system according to claim 1, wherein the power supply unit generates at least one secondary supply voltage ($V_{cc}$) and at least one auxiliary voltage ($V_{aux}$) and the sequencing microcontroller monitors at least mode control signal ($S_{on}$) provided by the chipset for a request to enter a predefined operating mode of the computer system, activates a timer in response to detection of a request to enter the predefined operating mode, monitors the provision of the secondary supply voltage ($V_{cc}$) from the power supply unit to the system board, and signals a failure of the AC supply voltage ($V_{AC}$) if the provision of the secondary supply voltage ($V_{cc}$) is not detected within a predetermined period of time ($T_{max}$).

8. The computer system according to claim 7, wherein the sequencing microcontroller monitors at least one of the following control signals:
   a first power good signal ($PG_{PSU}$) provided by the power supply unit indicating that the secondary supply voltage ($V_{cc}$) at an output terminal of the power supply unit has reached a first predefined voltage level and a second power good signal ($PG_{VC}$) provided by a voltage comparator of the system board indicating that the secondary supply voltage ($V_{cc}$) at a supply line of the system board has reached a second predefined voltage level.

9. The computer system according to claim 1, wherein the sequencing microcontroller detects the shutdown of the system based on monitoring a state of at least one mode control signal to selectively switch the power supply unit from a standby mode into a normal operating mode and vice versa.

10. The computer system according to claim 1, wherein the sequencing microcontroller monitors a mode control signal or a secondary supply voltage to detect a shutdown of the system board, and, if the sequencing microcontroller detects a shutdown of the system board, the sequencing microcontroller sends a hardware control signal to a power button pin of the chipset to reboot the system board.

11. A method of operating a computer system, the computer system comprising a power supply unit and a system board electrically connected to the power supply unit, the system board comprising a sequencing microcontroller, a CPU and a chipset, wherein the sequencing microcontroller selectively activates further components of the system board, including the CPU and the chipset, and performs the following steps:
   monitoring at least one control signal provided by the chipset and/or the power supply unit to detect a shutdown of the system board;
   if a shutdown is detected, signaling a reboot command to at least the chipset and activating a first timer;
   monitoring the at least one control signal provided by the chipset to determine if the rebooting of the system board is successful and deactivating the first timer if the monitored control signal indicates that the rebooting of the system board was successful; and resending the reboot command, if the activated first timer reaches a predetermined value.

12. The method in accordance with claim 11, wherein the sequencing microcontroller additionally performs the following steps:
   detecting a connection of the power supply unit to an AC supply voltage ($V_{AC}$);
   activating a second timer in response to a request to enter a predefined operating mode of the computer system;
   monitoring at least one power good signal ($PG_{PSU}$, $PG_{VC}$) for at least a predetermined period of time ($T_{max}$); and
   signaling a failure of the AC supply voltage ($V_{AC}$) to at least the chipset if the at least one power good signal ($PG_{PSU}$, $PG_{VC}$) is not received within the predetermined period of time ($T_{max}$) from the request to enter the predefined operating mode of the computer system.

13. The method in accordance with claim 12, wherein the steps of activating the second timer and monitoring the at least one power good signal ($PG_{PSU}$, $PG_{VC}$) are performed during an initialization state of the computer system.

14. The method in accordance with claim 12, wherein the sequencing microcontroller further performs the following steps:
   continuously monitoring the at least power good signal ($PG_{PSU}$, $PG_{VC}$) during a normal operation mode of the computer system; and
   signaling a failure of the AC supply voltage ($V_{AC}$) to at least the chipset if the at least one power good signal ($PG_{PSU}$, $PG_{VC}$) is deactivated in the normal operation mode of the computer system.

15. The method in accordance with claim 12, wherein in the step of detecting the connection of the power supply unit to an AC supply voltage ($V_{AC}$), the sequencing microcontroller detects provision of a previously absent auxiliary voltage ($V_{aux}$) from the power supply unit indicative of the connection of the power supply unit to the AC supply voltage ($V_{AC}$).

16. The method in accordance with claim 12, wherein the sequencing microcontroller provides the auxiliary voltage ($V_{aux}$) to the chipset after detection of the connection of the power supply unit and wherein the step of signaling the failure of the AC supply voltage ($V_{AC}$) comprises interrupting the provision of a DC supply voltage ($V_{cc}$, $V_{aux}$) to the chipset of the system board for a predetermined amount of time to signal the failure of the AC supply voltage ($V_{AC}$).

17. The method in accordance with claim 12, wherein the step of signaling the failure of the AC supply voltage ($V_{AC}$) comprises providing a resume-reset control signal from the sequencing microcontroller to the chipset for a predetermined amount of time to signal the failure of the AC supply voltage ($V_{AC}$).

18. The method according to claim 11, wherein the shutdown of the system is detected by the sequencing microcontroller based on monitoring a state of at least one mode control signal to selectively switch the power supply unit from a standby mode into a normal operating mode and vice versa.

19. The method according to claim 11, wherein a shutdown is triggered manually by a user or automatically by a software.

\* \* \* \* \*

UNITED STATES PATENT AND TRADEMARK OFFICE
CERTIFICATE OF CORRECTION

PATENT NO. : 10,025,595 B2
APPLICATION NO. : 14/533441
DATED : July 17, 2018
INVENTOR(S) : Staude et al.

Page 1 of 1

It is certified that error appears in the above-identified patent and that said Letters Patent is hereby corrected as shown below:

In the Claims

At Column 10, Line 14 (Claim 7), please insert --one-- after "least".

Signed and Sealed this
Twenty-fifth Day of September, 2018

Andrei Iancu
*Director of the United States Patent and Trademark Office*